(12) United States Patent
Kameda

(10) Patent No.: US 7,387,840 B2
(45) Date of Patent: Jun. 17, 2008

(54) LIGHT RAY CUT FILTER

(75) Inventor: Eiichi Kameda, Kakogawa (JP)

(73) Assignee: Daishinku Corporation, Hyogo (JP)

( * ) Notice: Subject to any disclaimer, the term of this patent is extended or adjusted under 35 U.S.C. 154(b) by 3 days.

(21) Appl. No.: 10/519,490

(22) PCT Filed: May 26, 2004

(86) PCT No.: PCT/JP2004/007588

§ 371 (c)(1),
(2), (4) Date: Dec. 30, 2004

(87) PCT Pub. No.: WO2004/106995

PCT Pub. Date: Dec. 9, 2004

(65) Prior Publication Data

US 2005/0253048 A1 Nov. 17, 2005

(30) Foreign Application Priority Data

May 29, 2003 (JP) ............................. 2003-152751

(51) Int. Cl.
B32B 17/06 (2006.01)
(52) U.S. Cl. ........................................ 428/432; 428/428
(58) Field of Classification Search ................ 428/426, 428/432
See application file for complete search history.

(56) References Cited

U.S. PATENT DOCUMENTS 5,644,124 A * 7/1997 Hamada et al. ............. 250/216

FOREIGN PATENT DOCUMENTS

| JP | 8-275182 | 10/1996 |
| JP | 2000-314808 | 11/2000 |
| JP | 2003-29027 | 1/2003 |

* cited by examiner

Primary Examiner—Gwendolyn Blackwell
(74) Attorney, Agent, or Firm—Wenderoth, Lind & Ponack, L.L.P.

(57) ABSTRACT

An IR-cut filter comprises a crystal plate and a multilayer film formed on one side of the crystal plate. The multilayer film is composed of first thin films made of a high refractive index material and second thin films made of a low refractive index material, which are alternately layered. The multilayer film is composed of a first layer, a second layer and a third layer sequentially from one side of the crystal plate. Film thicknesses of the layered first and second thin films differ from layer to layer so that the layers have different thicknesses. The layers have thicknesses which are sequentially increased. The multilayer film is provided with a sharpness prevention means for preventing a sharp change in transmittance within a visible region. The sharpness prevention means provides an inflection point at a wavelength band in which transmittance changes sharply.

8 Claims, 14 Drawing Sheets (a)

(b)

(a)

(b)

LIGHT RAY CUT FILTER

TECHNICAL FIELD

The present invention relates to a ray cut filter that filters out light in a predetermined wavelength band.

BACKGROUND ART

An optical system of an electronic camera, typically including general video cameras, digital still cameras and the like, comprises an integrated optical system, an IR(Infrared Ray)-cut filter, an optical low pass filter, and an imaging device, such as a CCD (Charge Coupled Device), a MOS (Metal Oxide Semiconductor) or the like, which are placed sequentially along an optical axis with the closest to the subject listed first (see, for example, JP 2000-209510A).

An imaging device as described above has sensitivity characteristics that respond to light in a wider wavelength band than that visible to the human eye (visible light) as shown in FIG. 13. In other words, the imaging device responds to infrared or ultraviolet light as well as visible light. It should be noted that FIG. 13(a) shows the sensitivity characteristics of the human eye, while FIG. 13(b) shows the sensitivity characteristics of a general CCD.

As can be seen from these figures, the human eye responds to light in the wavelength range of about 400 to 620 nm in the dark and light in the wavelength range of about 420 to 700 nm in the light. In contrast, the CCD responds to light in the wavelength range of 400 to 700 nm as well as light having a wavelength of less than 400 nm and light having a wavelength of more than 700 nm.

Therefore, in an imaging device as described in JP 2000-209510A, an IR-cut filter is provided in addition to a CCD to prevent infrared light from reaching the imaging device, thereby obtaining a captured image which is more approximate to that perceived by the human eye.

Conventional examples of such an IR-cut filter include an infrared absorbing glass which is transparent to visible light and absorbs infrared light, an infrared cut coat which is transparent to visible light and reflects infrared light, and the like.

An example of an infrared absorbing glass is blue glass in which a pigment, such as copper ion or the like, is dispersed.

An example of an infrared cut coat is a dielectric multilayer film in which a high refractive index material, such as $TiO_2$, $ZrO_2$, $Ta_2O_5$, $Nb_2O_5$ or the like, and a low refractive index material, such as $SiO_2$, $MgF_2$ or the like, are alternately layered up to several tens of layers on a transparent plate.

The infrared absorbing glass and infrared cut coat will be hereinafter described with reference to FIG. 14. It should be noted that FIG. 14(a) shows transmittance characteristics when an infrared absorbing glass is used in an imaging device, while FIG. 14(b) shows transmittance characteristics when an infrared cut coat is used.

Firstly, as shown in FIG. 14(a), when an infrared absorbing glass is used, "characteristics in which transmittance decreases gradually" can be obtained from a visible region to an infrared region, which are approximate to the sensitivity characteristics of the human eye.

However, when an infrared absorbing glass is used, it is difficult to adjust a point, where the transmittance is substantially 0%, to 700 nm. In the case of the infrared absorbing glass of FIG. 14(a), light at about 750 nm is also transmitted. In other words, infrared light is not completely cut out, so that the infrared image is captured by an imaging device.

Next, as shown in FIG. 14(b), when an infrared cut coat is used, "characteristics in which transmittance decreases sharply" can be obtained. Therefore, it is easy to adjust a point, where the transmittance is substantially 0%, to 700 nm.

However, in the case where transmittance changes in such a sharp manner, an image captured by an imaging device has a color different from that perceived by the human eye.

Therefore, the present invention is provided in order to solve the above-described problems. An object of the present invention is to provide a ray cut filter which prevents transmittance from changing sharply in a predetermined wavelength band (e.g., a visible region) to obtain transmittance characteristics approximate to those perceived by the human eye.

SUMMARY OF THE INVENTION

In order to achieve the above-described object, the ray cut filter of the present invention comprises a transparent plate and a multilayer film formed on the transparent plate. The multilayer film is composed of first thin films made of a high refractive index material and second thin films made of a low refractive index material, the first thin films and the second thin films being alternately layered. The multilayer film is provided with a sharpness prevention means for providing an inflection point at a wavelength within a change wavelength band in which the transmittance changes sharply to prevent a sharp change in transmittance in a predetermined wavelength band.

According to this invention, the sharpness prevention means for providing an inflection point is provided. Therefore, a sharp change in transmittance within the predetermined wavelength band (e.g., a visible region) is prevented, thereby making it possible to obtain transmittance characteristics approximate to those perceived by the human eye. Therefore, images can be captured by an imaging device, which have colors which are approximate to those perceived by the human eye, thereby making it possible to improve the reproducibility of color. As used herein, the term "first thin films and second thin films are alternately layered" does not mean that the first thin films and the second thin films are alternately continuously layered. A thin film made of other media, such as alumina ($Al_2O_3$), may be inserted between the films.

In the above-described structure, the multilayer film may be composed of a plurality of layers ordinally numbered from the transparent plate side. Each of the layers may be composed of the layered first and second thin films, optical film thicknesses of the first thin film and the second thin film differ from layer to layer so that the layers have a thickness from that of each other. In the sharpness prevention means, an optical film thickness of each thin film in each layer may be designed so that the layered first and second thin films have substantially the same optical film thickness in at least one of the layers, while the layered first and second thin films have optical film thicknesses gradually increased from the transparent plate side in the other layers.

In this case, in the sharpness prevention means, the optical film thickness of each thin film in each layer may be designed so that the layered first and second thin films have substantially the same optical film thickness in at least one of the layers, while the layered first and second thin films have optical film thicknesses gradually increased from the transparent plate side in the other layers. Therefore, it is possible to provide an inflection point at a wavelength within a change wavelength band, in which the transmittance changes sharply.

Specifically, in the above-described structure, the layers may include a first layer, a second layer and a third layer, thicknesses of the first, second and third layers being increased sequentially. The layers in which the first and second thin films have substantially the same optical film thickness may be the second and third layers, and the other layer may be the first layer.

In this case, the thicknesses of the first, second and third layers being increased sequentially, and the layers in which the first and second thin films have substantially the same optical film thickness are the second and third layers, and the other layer is the first layer. Therefore, it is possible to prevent a sharp change in transmittance in a high transmittance region, for example, around 90% transmittance.

Alternatively, in the above-described structure, the layers may include a first layer, a second layer and a third layer, thicknesses of the first, second and third layers being increased sequentially. The layers in which the first and second thin films have substantially the same optical film thickness may be the first and third layers, and the other layer may be the second layer.

In this case, the thicknesses of the first, second and third layers being increased sequentially, and the layers in which the first and second thin films have substantially the same optical film thickness are the first and third layers, and the other layer is the second layer. Therefore, it is possible to prevent a sharp change in transmittance in a low transmittance region, for example, around 30% transmittance.

In the above-described structure, the multilayer film corresponding to a wavelength band from a visible region to an infrared region may be formed on one side of the transparent plate, while the multilayer film corresponding to a wavelength band from an ultraviolet region to a visible region may be formed on the other side of the transparent plate.

In this case, the multilayer film corresponding to a wavelength band from a visible region to an infrared region is formed on one side of the transparent plate, while the multilayer film corresponding to a wavelength band from an ultraviolet region to a visible region is formed on the other side of the transparent plate. Therefore, it is possible to prevent a sharp change in transmittance within a whole visible band from an ultraviolet region through a visible region to an infrared region.

Further, in the above-described structure, the optical film thicknesses of the first and second thin films may be changed by a small amount in the layer in which the first and second thin films have substantially the same optical film thickness.

In this case, the optical film thicknesses of the first and second thin films are changed by a small amount in the layer in which the first and second thin films have substantially the same optical film thickness. Therefore, it is possible to suppress a change amount of transmittance which changes by a small amount due to external noise within a predetermined wavelength band other than a wavelength band in which the transmittance changes sharply.

Furthermore, in the above-described structure, in the sharpness prevention means, at least one adjustment layer may be provided at least one of locations between the layers and on both ends of the layered structure, and the adjustment layer may prevent a change amount in transmittance changing sharply between the layers.

In this case, the adjustment layer is provided and the adjustment layer prevents a change amount in transmittance changing sharply between the layers. Therefore, an inflection point is more preferably formed.

BRIEF DESCRIPTION OF DRAWINGS

FIG. 1($b$) is a structural diagram showing the IR-cut filter of Embodiment 1 of the present invention.

FIG. 13($b$) is a diagram showing the sensitivity characteristics of a general CCD.

FIG. 14($b$) is a diagram showing transmittance characteristics of infrared cut coat.

BEST MODE FOR CARRYING OUT THE INVENTION

Hereinafter, embodiments of the present invention will be described with reference to the accompanying drawings. It should be noted that the present invention is applied to an IR-cut filter as a ray cut filter in embodiments described below.

Embodiment 1

Figure 1:
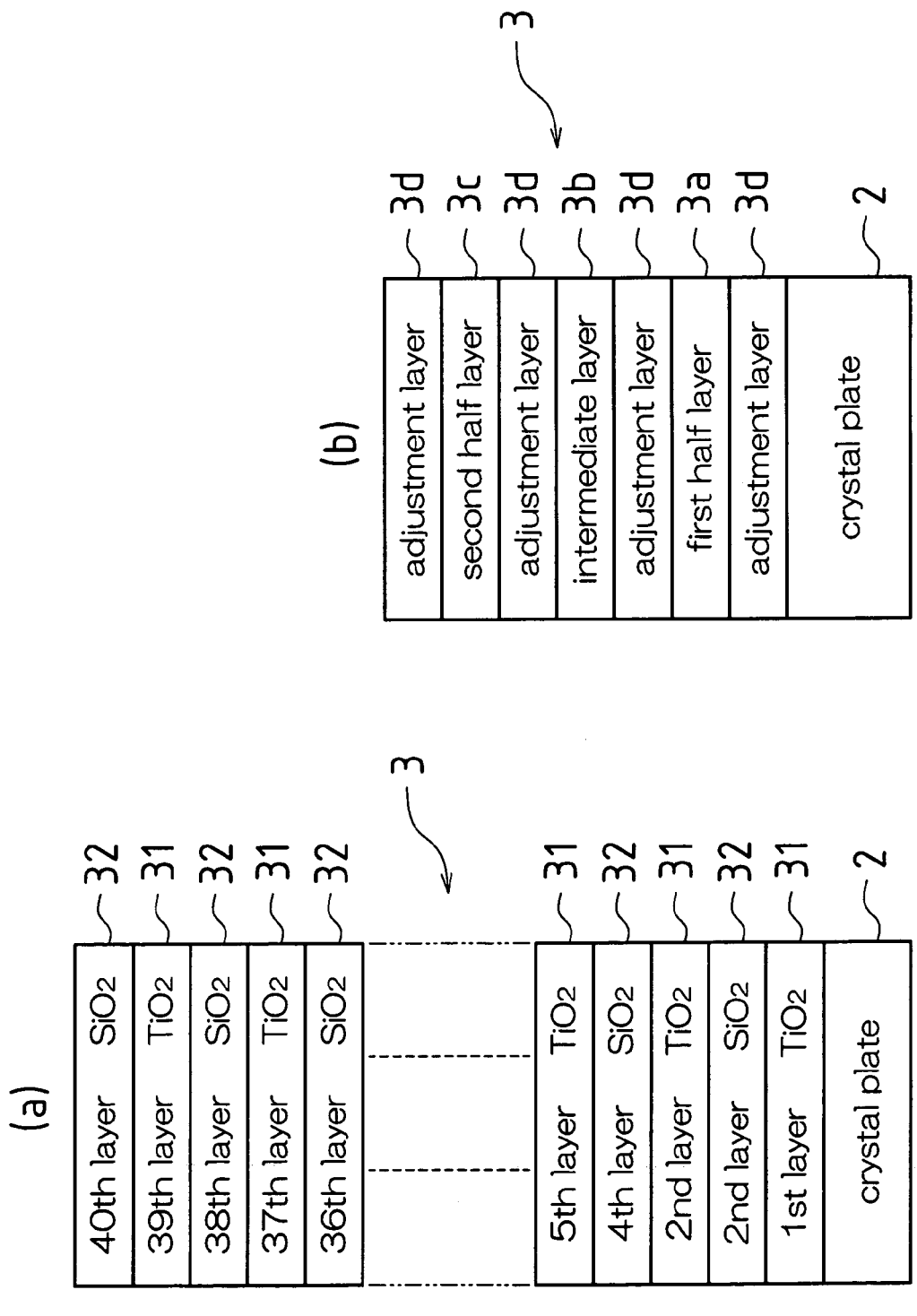
FIG. 1($a$) is a schematic diagram showing a structure of an IR-cut filter according to Embodiment 1 of the present invention.

As shown in FIG. 1($a$), an IR-cut filter 1 according to Embodiment 1 of the present invention comprises a crystal plate 2, which is a transparent plate, and a multilayer film 3, which is formed on one side of the crystal plate 2.

The multilayer film 3 is composed of first thin films 31 made of a high refractive index material and second thin films 32 made of a low refractive index material, which are alternately layered. Specifically, odd-numbered layers counted from this side of the crystal plate 2 are composed of the first thin film 31, while even-numbered layers are composed of the second thin film 32. It should be noted that, in Embodiment 1, $TiO_2$ is used for the first thin film, while $SiO_2$ is used for the second thin film.

The multilayer film 3 is fabricated as follows. $TiO_2$ and $SiO_2$ are vacuum deposited alternately on one side of the crystal plate 2 using a well-known vacuum deposition apparatus (not shown) to form the multilayer film 3 as shown in FIG. 1(*a*). It should be noted that a thickness of each thin film 31, 32 is adjusted by performing a deposition operation while monitoring the film thickness, and when the film thickness reaches a predetermined value, stopping the deposition of a deposition material ($TiO_2$, $SiO_2$) by, for example, closing a shutter (not shown) provided near a deposition source (not shown).

Also, as shown in FIG. 1(*b*), the multilayer film 3 is composed of a plurality of layers ordinally numbered from one side of the crystal plate 2, for example, a first layer 3*a*, a second layer 3*b* and a third layer 3*c* in Embodiment 1. Each of the first layer 3*a*, the second layer 3*b* and the third layer 3*c* is composed by layering the first thin film 31 and the second thin film 32. Since optical film thicknesses of the layered first and second thin films 31 and 32 differ from layer to layer, the first layer 3*a*, the second layer 3*b* and the third layer 3*c* have a thickness different from that of each other. In addition, the first layer 3*a*, the second layer 3*b* and the third layer 3*c* have thicknesses which are increased in this order. It should be noted that an optical film thickness as used herein is calculated by the following expression 1.

$$Nd = d \times N \times 4/\lambda \qquad \text{[Expression 1]}$$

(Nd: optical film thickness, d: physical film thickness, N: refractive index, $\lambda$: center wavelength)

Figure 2:
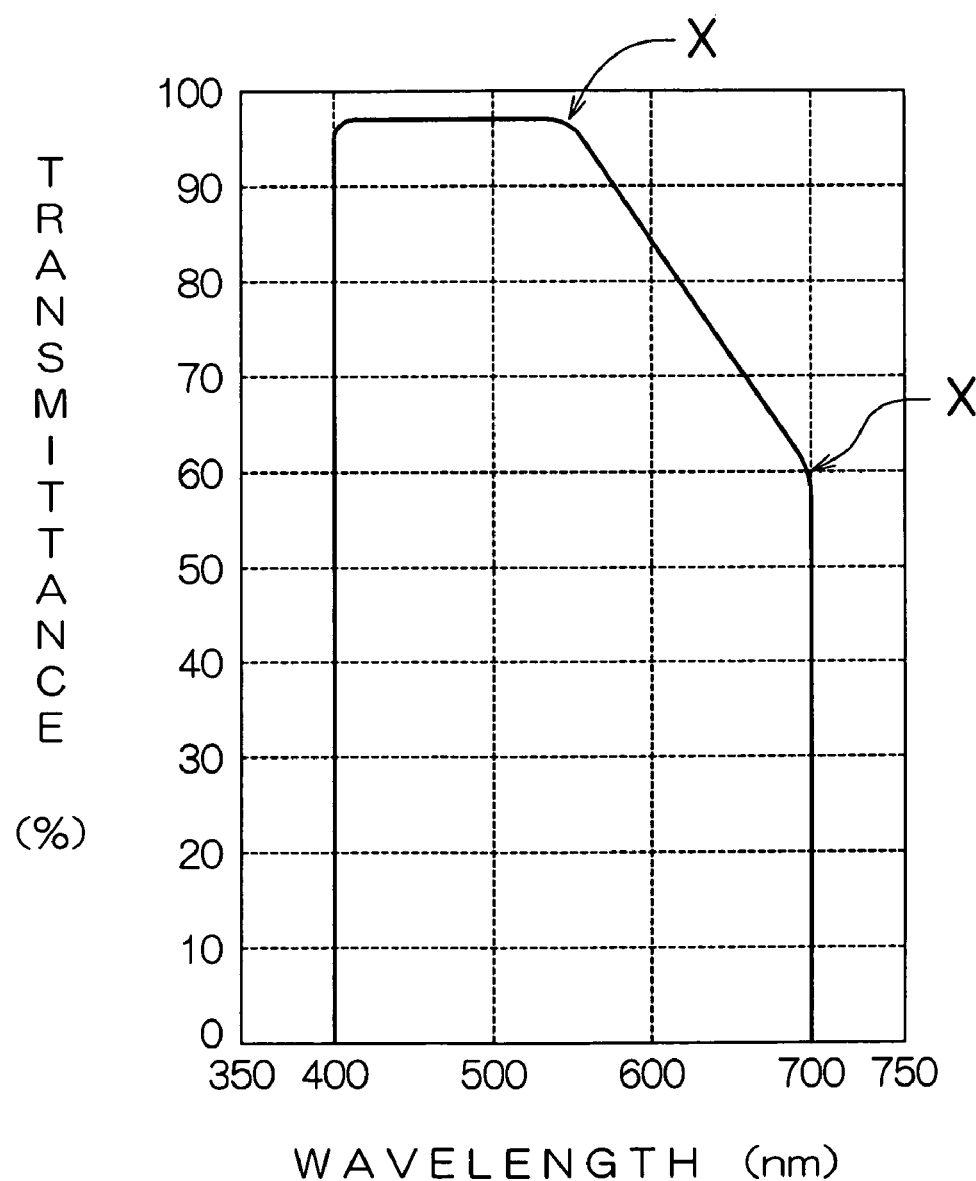
FIG. 2 is a schematic diagram showing transmittance characteristics of an IR-cut filter according to Embodiment 1 of the present invention.

The multilayer film 3 is further provided with a sharpness prevention means for preventing the transmittance from changing sharply within a predetermined wavelength band. The sharpness prevention means provides an inflection point X at a wavelength in a change wavelength band in which the transmittance changes sharply as shown in FIG. 2. It should be noted that the predetermined wavelength band described in Embodiment 1 indicates a visible region (400 to 700 nm).

The sharpness prevention means is established by setting the optical film thickness of each thin film 31, 32 of the first layer 3*a*, the second layer 3*b* and the third layer 3*c* as follows. The first thin film 31 and the second thin film 32 that are layered in any two of the first layer 3*a*, the second layer 3*b* and the third layer 3*c* have substantially the same optical film thickness, while the first thin film 31 and the second thin film 32 that are layered in the other layer have optical film thicknesses which are gradually increased from the crystal plate 2 side.

Further, in the sharpness prevention means, an adjustment layer 3*d* is provided between the first layer 3*a* and the second layer 3*b* and between the second layer 3*b* and the third layer 3*c*, and an adjustment layer 3*d* is further provided on both ends of the layered structure, as shown in FIG. 1(*b*). The adjustment layer 3*d* suppresses the change amount of transmittance that changes sharply between the first layer 3*a*, the second layer 3*b* and the third layer 3*c*.

Furthermore, in Embodiment 1, the second layer 3*b* and the third layer 3*c* are layers in which the first thin film 31 and the second thin film 32 have substantially the same optical film thickness, while the other layer is the first layer 3*a*. In addition, in the second layer 3*b* and the third layer 3*c* in which the first thin film 31 and the second thin film 32 have substantially the same optical film thickness, the optical film thicknesses of the first thin film 31 and the second thin film 32 are designed to be changed by a small amount so as to finely adjust the wavelength characteristics of the IR-cut filter 1.

With the above-described structure, the IR-cut filter 1 of Embodiment 1 obtains transmittance characteristics as shown in FIG. 2.

The wavelength characteristics of the IR-cut filter 1 of Embodiment 1 were actually measured. The result of the measurement was described below.

Example 1

In Example 1, a crystal plate 2 having a refractive index of 1.54 was used as a transparent plate. Also, $TiO_2$ having a refractive index of 2.30 was used as the first thin film 31 and $SiO_2$ having a refractive index of 1.46 was used as the second thin film 31. The center wavelength of these layers was set to 700 nm.

Figure 3:
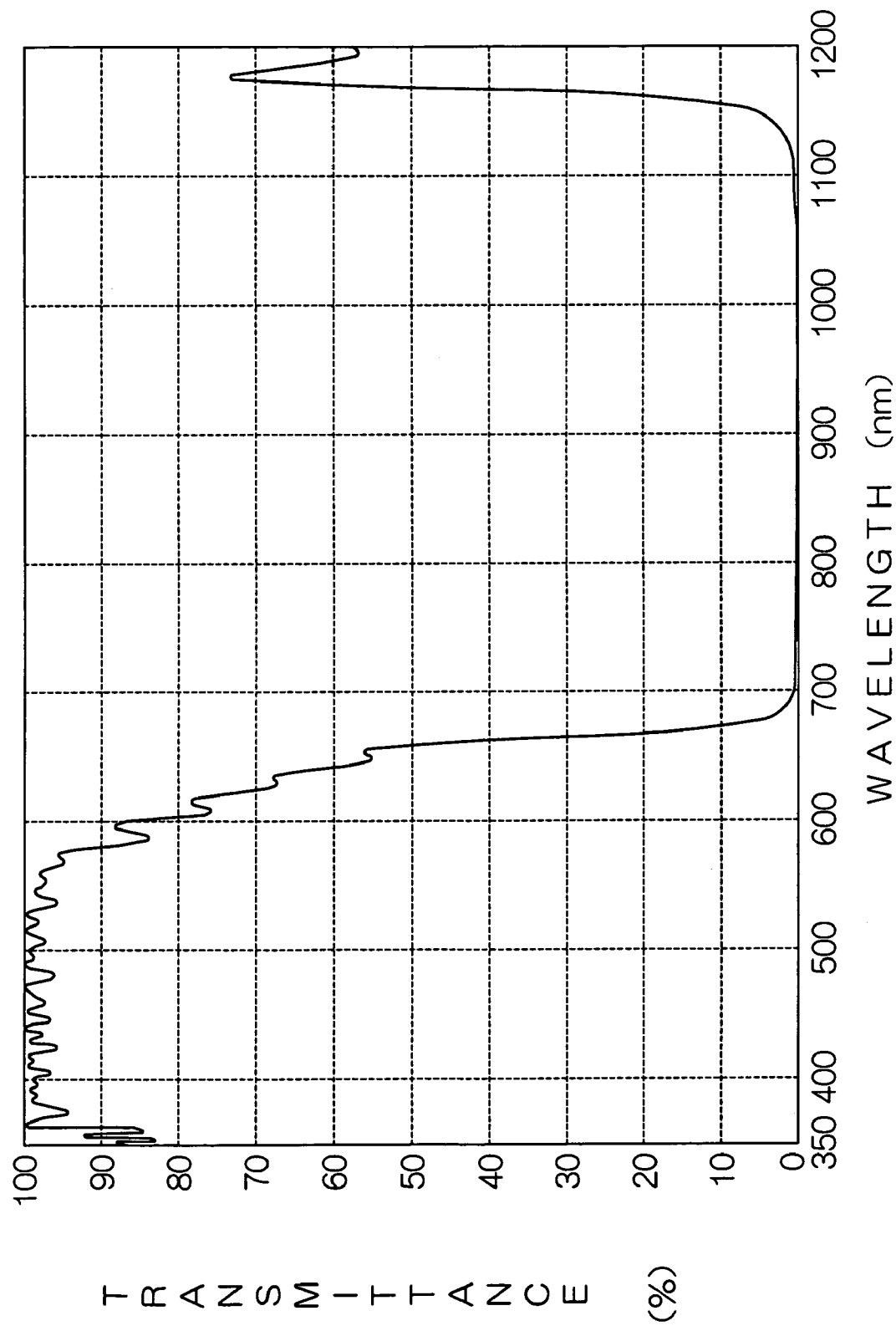
FIG. 3 is a schematic diagram showing transmittance characteristics of an IR-cut filter according to Example 1 of the present invention.

The thin films 31, 32 are formed by a production method for the multilayer film 3 having 40 layers so that the thin films 31, 32 each have an optical film thickness as shown in Table 1. As a result, transmittance characteristics as shown in FIG. 3 were obtained. It should be noted that the angle of incidence of light is 0 degrees, i.e., light is incident normal to the multilayer film 3 in Example 1.

TABLE 1

| layer | deposited material | refractive index N | optical film thickness Nd | center wavelength $\lambda$ (nm) |
|---|---|---|---|---|
| 1 | $TiO_2$ | 2.30 | 1.20 | 700 |
| 2 | $SiO_2$ | 1.46 | 1.05 | 700 |
| 3 | $TiO_2$ | 2.30 | 1.05 | 700 |
| 4 | $SiO_2$ | 1.46 | 1.05 | 700 |
| 5 | $TiO_2$ | 2.30 | 1.05 | 700 |
| 6 | $SiO_2$ | 1.46 | 1.05 | 700 |
| 7 | $TiO_2$ | 2.30 | 1.12 | 700 |
| 8 | $SiO_2$ | 1.46 | 1.12 | 700 |
| 9 | $TiO_2$ | 2.30 | 1.12 | 700 |
| 10 | $SiO_2$ | 1.46 | 1.12 | 700 |
| 11 | $TiO_2$ | 2.30 | 1.07 | 700 |
| 12 | $SiO_2$ | 1.46 | 1.07 | 700 |
| 13 | $TiO_2$ | 2.30 | 1.12 | 700 |
| 14 | $SiO_2$ | 1.46 | 1.12 | 700 |
| 15 | $TiO_2$ | 2.30 | 1.12 | 700 |
| 16 | $SiO_2$ | 1.46 | 1.12 | 700 |
| 17 | $TiO_2$ | 2.30 | 1.12 | 700 |
| 18 | $SiO_2$ | 1.46 | 1.08 | 700 |
| 19 | $TiO_2$ | 2.30 | 1.20 | 700 |
| 20 | $SiO_2$ | 1.46 | 1.20 | 700 |
| 21 | $TiO_2$ | 2.30 | 1.20 | 700 |
| 22 | $SiO_2$ | 1.46 | 1.30 | 700 |
| 23 | $TiO_2$ | 2.30 | 1.40 | 700 |
| 24 | $SiO_2$ | 1.46 | 1.40 | 700 |
| 25 | $TiO_2$ | 2.30 | 1.40 | 700 |
| 26 | $SiO_2$ | 1.46 | 1.40 | 700 |
| 27 | $TiO_2$ | 2.30 | 1.40 | 700 |
| 28 | $SiO_2$ | 1.46 | 1.40 | 700 |
| 29 | $TiO_2$ | 2.30 | 1.40 | 700 |
| 30 | $SiO_2$ | 1.46 | 1.40 | 700 |
| 31 | $TiO_2$ | 2.30 | 1.40 | 700 |
| 32 | $SiO_2$ | 1.46 | 1.40 | 700 |
| 33 | $TiO_2$ | 2.30 | 1.40 | 700 |
| 34 | $SiO_2$ | 1.46 | 1.40 | 700 |
| 35 | $TiO_2$ | 2.30 | 1.40 | 700 |
| 36 | $SiO_2$ | 1.46 | 1.40 | 700 |
| 37 | $TiO_2$ | 2.30 | 1.40 | 700 |
| 38 | $SiO_2$ | 1.46 | 1.40 | 700 |
| 39 | $TiO_2$ | 2.30 | 1.40 | 700 |
| 40 | $SiO_2$ | 1.46 | 0.70 | 700 |

Table 1 shows the composition of the multilayer film 3 of the IR-cut filter 1 and the optical film thickness of each thin film 31, 32.

Further, in Example 1, as shown in Table 1, layers 1, 11, 12, 18 to 22, and 40 of the 40 layers of the multilayer film 3 are adjustment layers 3d.

As shown in FIG. 3, it is found that the transmittance of the IR-cut filter 1 of Example 1 decreases gradually for light having a wavelength from about 550 nm to about 650 nm. In other words, the transmittance decreases gradually in a band from a visible region to an infrared region, i.e., the sharp decrease in transmittance is prevented.

As described above, the IR-cut filter 1 can achieve transmittance characteristics that are approximate to those of the human eye, by providing the sharpness prevention means that provides an inflection point X to prevent a sharp change in transmittance in a band from a visible region to an infrared region. Therefore, images can be captured by an imaging device which have colors which are approximate to those perceived by the human eye, thereby making it possible to improve the reproducibility of color.

Further, the sharpness prevention means is established by setting the optical film thickness of each thin film 31, 32 of the first layer 3a, the second layer 3b and the third layer 3c as follows. The first thin film 31 and the second thin film 32 that are layered in any two of the first layer 3a, the second layer 3b and the third layer 3c have substantially the same optical film thickness, while the first thin film 31 and the second thin film 32 that are layered in the other layer have optical film thicknesses which are gradually increased from the crystal plate 2 side. Therefore, an inflection point can be provided at a wavelength in a change wavelength band in which the transmittance changes sharply.

Further, the first layer 3a, the second layer 3b and the third layer 3c have thicknesses which are sequentially increased. The first thin film 31 and the second thin film 32 have substantially the same optical film thickness in the second layer 3b and the third layer 3c, while the other layer is the first layer 3a. Therefore, it is possible to prevent a sharp change in transmittance in a high transmittance region, for example, around 90% transmittance as shown in FIG. 2.

Further, the optical film thicknesses of the first thin film 31 and the second thin film 32 in the second layer 3b and the third layer 3c are designed to be changed by a small amount. Therefore, small change amounts in transmittance (e.g., values no greater than a significant digit, which are not shown in the optical film thickness Nd of Table 1) can be suppressed in a predetermined wavelength band other than the change wavelength band in which the transmission changes sharply.

Further, the adjustment layer 3d is provided. The adjustment layer 3d suppresses a change amount of transmittance that changes sharply between the first layer 3a, the second layer 3b and the third layer 3c. Thus, the adjustment layer 3d is more preferable for the formation of the inflection point X.

Figure 4:
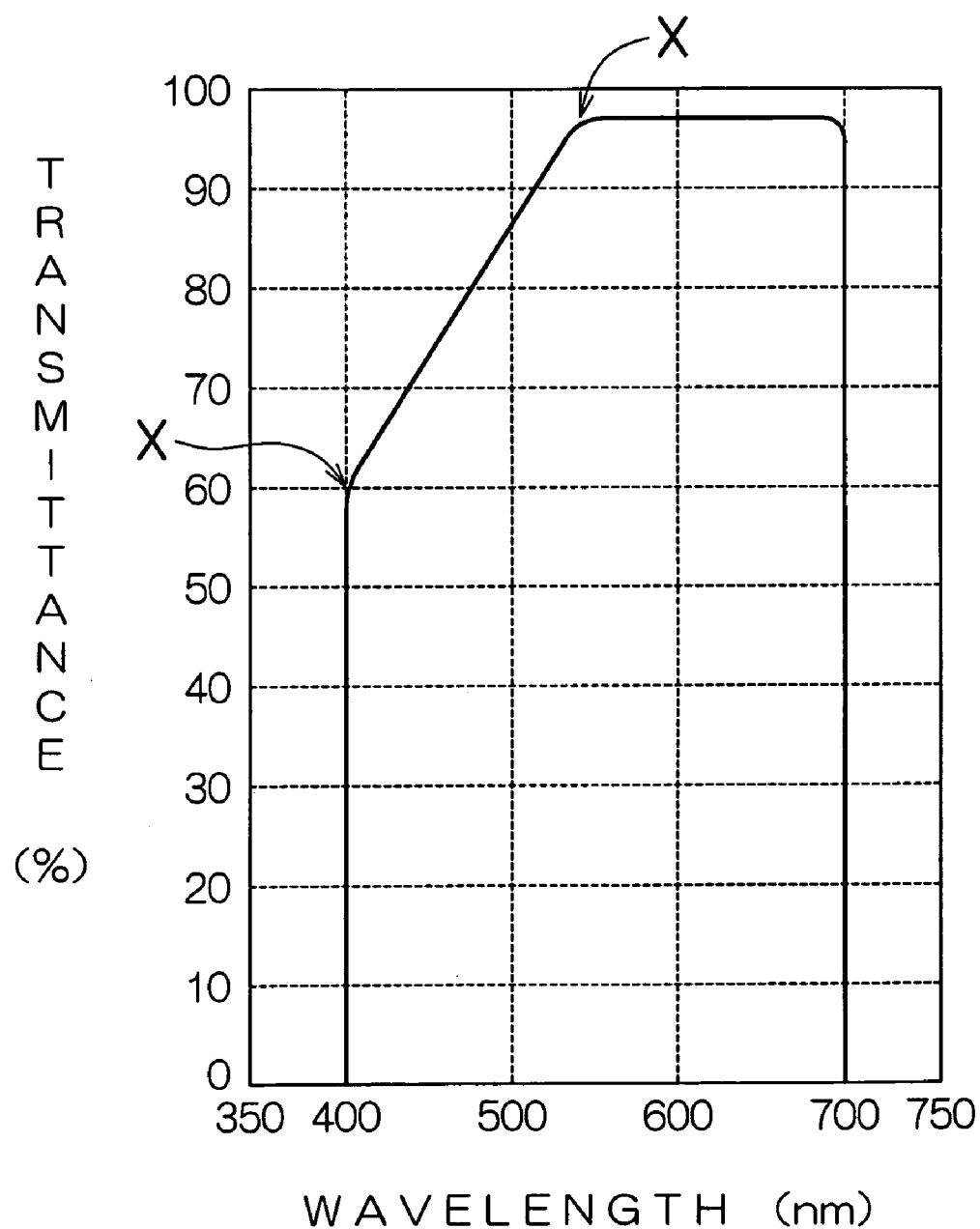
FIG. 4 is a schematic diagram showing transmittance characteristics of an ultraviolet cut filter according to Embodiment 1 of the present invention.

Although the multilayer film 3 is formed to cut light in a band from a visible region to an infrared region in Embodiment 1, the present invention is not limited thereto. A multilayer film may be formed to cut light in a band from an ultraviolet region to a visible region. In this case, the visible region has a wavelength as shown in FIG. 4, i.e., transmittance characteristics approximate to those perceived by the human eye can be obtained in the band from the ultraviolet region to the visible region.

Figure 5:
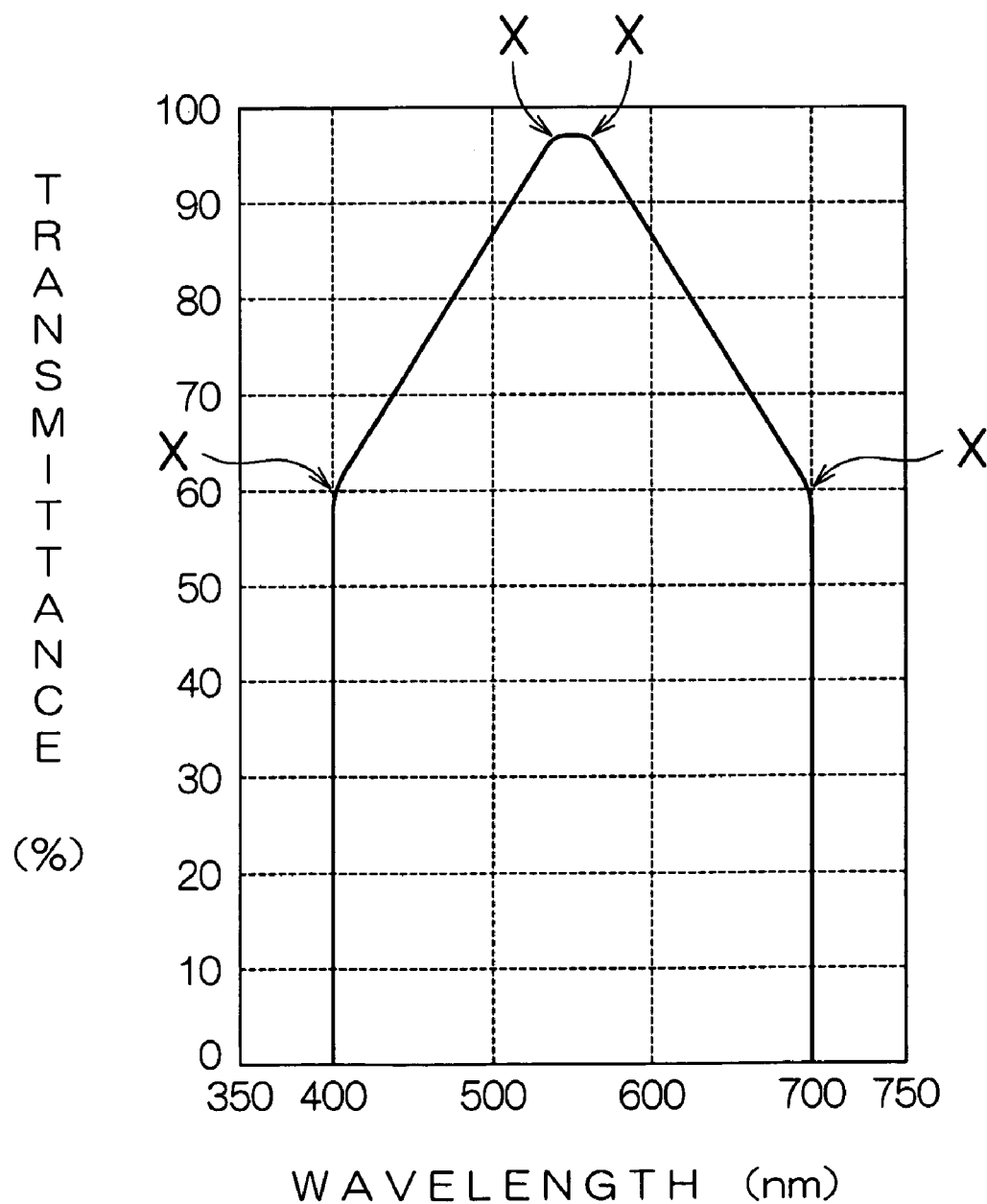
FIG. 5 is a schematic diagram showing transmittance characteristics of an ultraviolet IR-cut filter according to Embodiment 1 of the present invention.

Although the multilayer film 3 is formed on one side of the crystal plate 2 in order to cut light in a band from a visible region to an infrared region in Embodiment 1, the present invention is not limited thereto. For example, another multilayer film 3 may be formed on the other side of the crystal plate 2 in order to cult light in a band from an ultraviolet region to a visible region as well as the formation of the multilayer film 3 on the one side of the crystal plate 2 in order to cut light in a band from a visible region to an infrared region. In this case, the visible region has wavelength as shown in FIG. 5, so that transmittance characteristics approximate to those perceived by the human eye are obtained. Alternatively, a multilayer film 3 may be formed on one side of the crystal plate 2 in order to cut light in a band from an ultraviolet region to a visible region, while a multilayer film 3 may be formed on the other side of the crystal plate 2 in order to cut light in a band from a visible region to an infrared region. In this case, the same transmittance characteristics are obtained.

Although the crystal plate 2 is used as a transparent plate in Embodiment 1, the present invention is not limited thereto. Any plate that can be transparent to light, for example, a glass plate, may be used. There is no particular limitation regarding the crystal plate 2. The crystal plate 2 may be, for example, a double refraction plate made of either a single or a plurality of crystal plates.

Although the first thin film 31 is made of $TiO_2$ in Embodiment 1, the present invention is not limited thereto. The first thin film 31 only needs to be made of a high refractive index material, including, for example, $ZrO_2$, $Ta_2O_5$, $Nb_2O_5$ and the like. Although the second thin film 32 is made of $SiO_2$, the present invention is not limited thereto. The second thin film 32 only needs to be a low refractive index material, including, for example, $MgF_2$ and the like.

Although the predetermined wavelength band is a visible region in Embodiment 1, the present invention is not limited thereto. The predetermined wavelength band may be any other wavelength band or a further limited visible region.

Although, in the sharpness prevention means of Embodiment 1, the adjustment layer 3d is provided between the first layer 3a and the second layer 3b and between the second layer 3b and the third layer 3c, and the adjustment layer 3d is further provided on both ends of the layered structure, the present invention is not limited thereto. For example, the adjustment layer 3d may be provided at any of the locations between the first layer 3a and the second layer 3b, between the second layer 3b and the third layer 3c, and on both ends of the layered structure in order to suppress a change amount of transmittance that changes sharply any of the locations between the first layer 3a and the second layer 3b and between the second layer 3b and the third layer 3c.

Although the inflection points X are set to 60% and 96% transmittances in Embodiment 1 as shown in FIG. 2, these values are only for illustrative purposes and the present invention is not limited to these values.

Although the multilayer film 3 is composed of three layers, i.e., the first layer 3a, the second layer 3b and the third layer 3c in Embodiment 1, the present invention is not limited thereto. For example, the multilayer film 3 may be composed of three or more layers. In this case, a larger number of inflection points X can be preferably provided. Alternatively, the multilayer film 3 may be composed of the first layer 3a and the second layer 3b. In this case, a band from an ultraviolet region to a visible region is preferably adjusted.

Although the multilayer film 3 is composed of 40 layers in Example 1, the number of layers is not limited.

Embodiment 2

An IR-cut filter according to Embodiment 2 has the same structure as that of the above-described IR-cut filter 1 of Embodiment 1, except for the first layer 3a, the second layer 3b, the third layer 3c, and the adjustment layer 3d. Therefore, in Embodiment 2, the different first layer 3a, second layer 3b, third layer 3c and adjustment layer 3d will be described. The same parts are referenced with the same reference numerals and will not be explained.

A multilayer film of the IR-cut filter 1 of Embodiment 2 is composed of a first layer 3a, a second layer 3b and a third layer 3c sequentially from one side of a crystal plate 2 as shown in FIG. 1(b). Each of the first layer 3a, the second layer 3b and the third layer 3c is composed by layering a first thin film 31 and a second thin film 32. Since optical film thicknesses of the layered first and second thin films 31 and 32 differ from layer to layer, the first layer 3a, the second layer 3b, and the third layer 3c have a thickness different from that of each other. In addition, the first layer 3a, the second layer 3b and the third layer 3c have thicknesses which are increased in this order.

Figure 6:
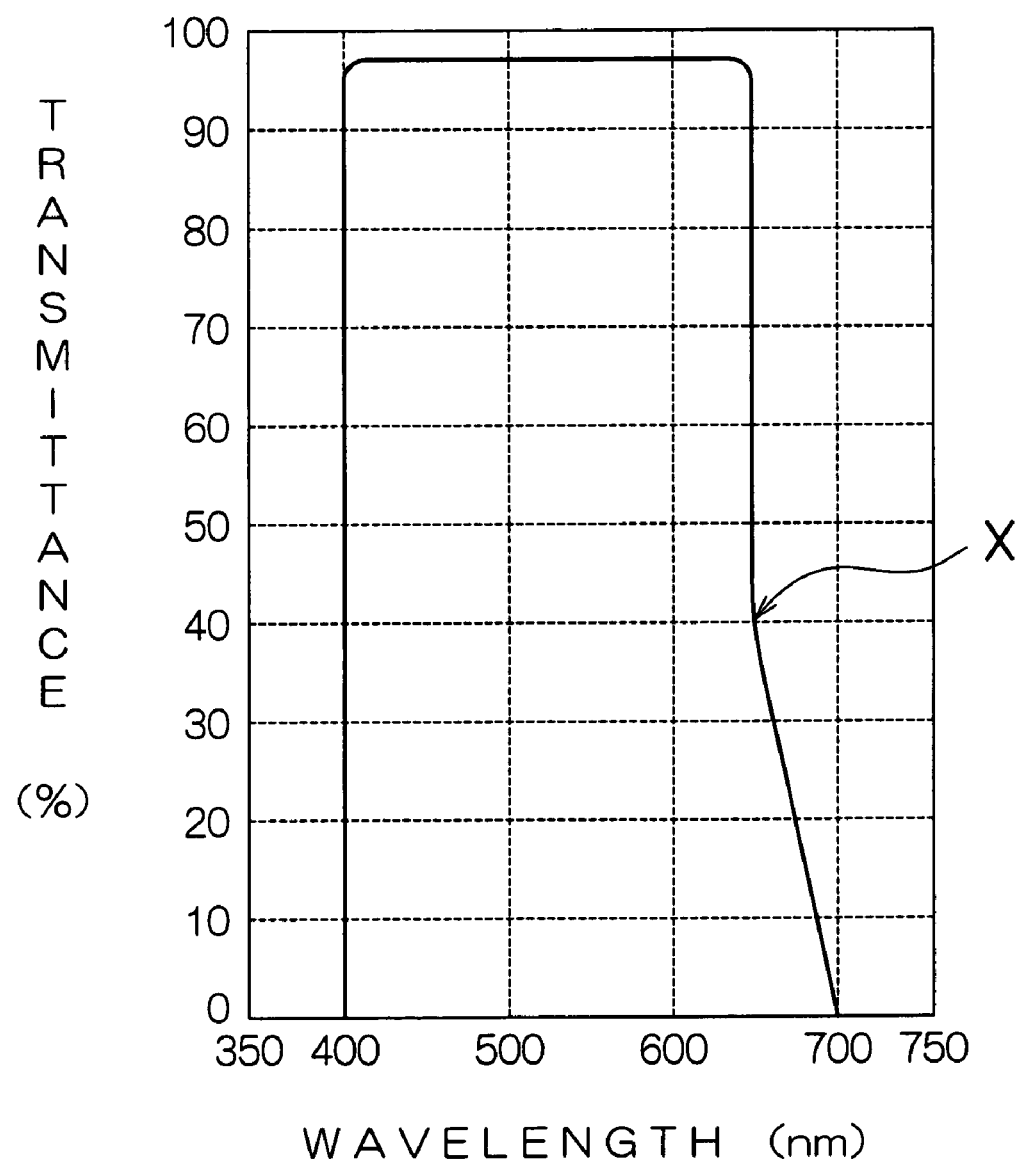
FIG. 6 is a schematic diagram showing transmittance characteristics of an IR-cut filter according to Embodiment 2 of the present invention.

The multilayer film 3 is further provided with a sharpness prevention means for preventing the transmittance from changing sharply within a predetermined wavelength band. The sharpness prevention means provides an inflection point X at a wavelength in a change wavelength band in which the transmittance changes sharply as shown in FIG. 6.

The sharpness prevention means is established by setting the optical film thickness of each thin film 31, 32 of the first layer 3a, the second layer 3b and the third layer 3c as follows. The first thin film 31 and the second thin film 32 that are layered in any two of the first layer 3a, the second layer 3b and the third layer 3c have substantially the same optical film thickness, while the first thin film 31 and the second thin film 32 that are layered in the other layer have optical film thicknesses which are gradually increased from the crystal plate 2 side.

Further, in the sharpness prevention means, an adjustment layer 3d is provided between the first layer 3a and the second layer 3b and between the second layer 3b and the third layer 3c, and an adjustment layer 3d is further provided on both ends of the layered structure, as shown in FIG. 1(b). The adjustment layer 3d suppresses the change amount of transmittance that changes sharply between the first layer 3a, the second layer 3b and the third layer 3c.

In Embodiment 2, the first layer 3a and the third layer 3c are layers in which the first thin film 31 and the second thin film 32 have substantially the same optical film thickness, while the other layer is the second layer 3b.

Further, in the first layer 3a and the third layer 3c in which the first thin film 31 and the second thin film 32 have substantially the same optical film thickness, the optical film thicknesses of the first thin film 31 and the second thin film 32 are designed to be changed by a small amount so as to finely adjust the wavelength characteristics of the IR-cut filter 1.

With the above-described structure, the IR-cut filter 1 of Embodiment 2 obtains transmittance characteristics as shown in FIG. 6.

The wavelength characteristics of the IR-cut filter 1 of Embodiment 2 were actually measured. The result of the measurement was described below.

Example 2

In Example 2, a crystal plate 2 having a refractive index of 1.54 was used as a transparent plate. Also, $TiO_2$ having a refractive index of 2.30 was used as the first thin film 31 and $SiO_2$ having a refractive index of 1.46 was used as the second thin film 31. The center wavelength of these layers was set to 700 nm.

Figure 7:
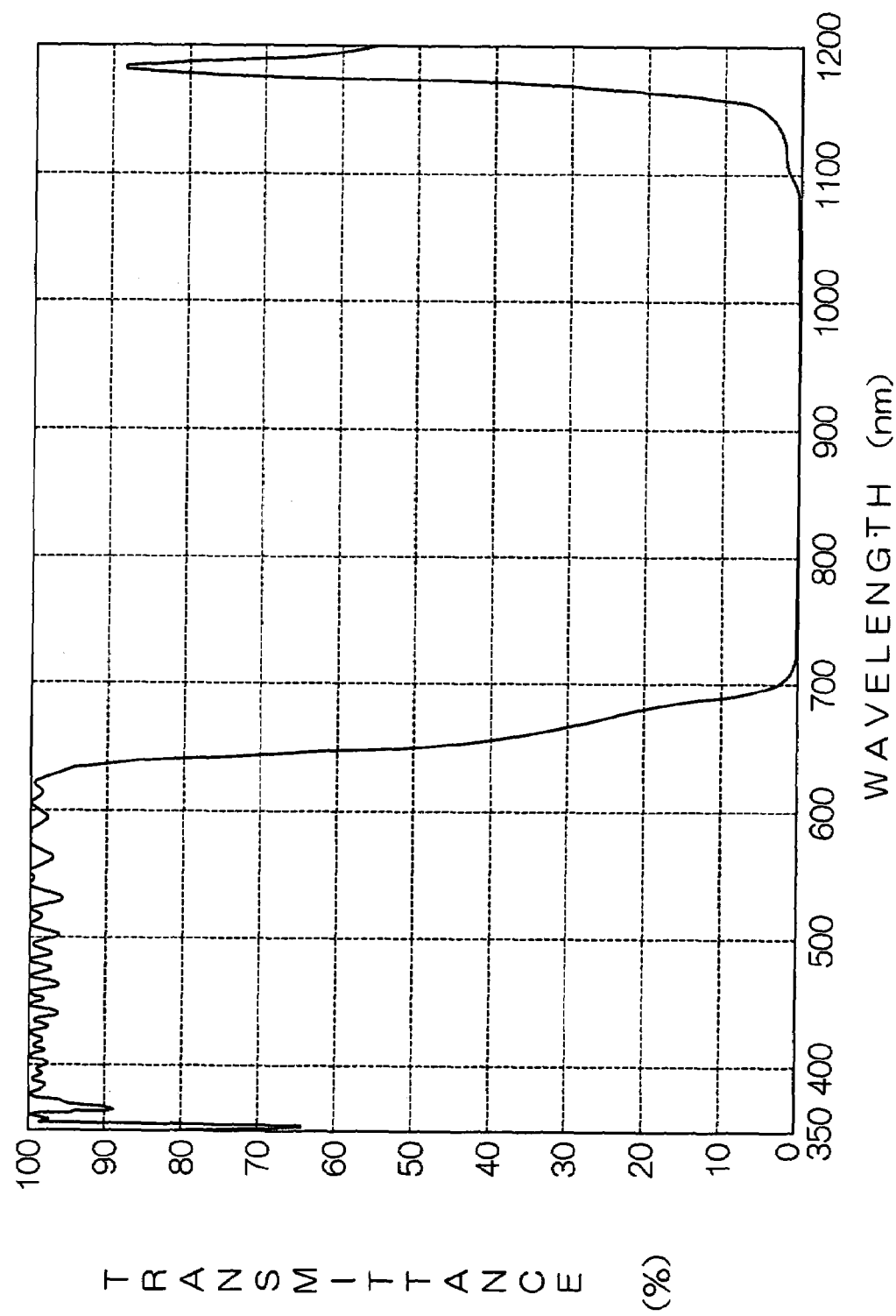
FIG. 7 is a schematic diagram showing transmittance characteristics of an IR-cut filter according to Example 2 of the present invention.

The thin films 31, 32 are formed by a production method for the multilayer film 3 having 40 layers, in which the thin films 31, 32 each have an optical film thickness as shown in Table 2. As a result, transmittance characteristics as shown in FIG. 7 were obtained. It should be noted that the angle of incidence of light is 0 degrees, i.e., light is incident normal to the multilayer film 3 in Example 2.

TABLE 2

| layer | deposited material | refractive index N | optical film thickness Nd | center wavelength λ (nm) |
|---|---|---|---|---|
| 1 | $TiO_2$ | 2.30 | 1.28 | 700 |
| 2 | $SiO_2$ | 1.46 | 1.17 | 700 |
| 3 | $TiO_2$ | 2.30 | 1.08 | 700 |
| 4 | $SiO_2$ | 1.46 | 1.08 | 700 |
| 5 | $TiO_2$ | 2.30 | 1.08 | 700 |
| 6 | $SiO_2$ | 1.46 | 1.08 | 700 |
| 7 | $TiO_2$ | 2.30 | 1.08 | 700 |
| 8 | $SiO_2$ | 1.46 | 1.08 | 700 |
| 9 | $TiO_2$ | 2.30 | 1.08 | 700 |
| 10 | $SiO_2$ | 1.46 | 1.10 | 700 |
| 11 | $TiO_2$ | 2.30 | 1.10 | 700 |
| 12 | $SiO_2$ | 1.46 | 1.14 | 700 |
| 13 | $TiO_2$ | 2.30 | 1.14 | 700 |
| 14 | $SiO_2$ | 1.46 | 1.17 | 700 |
| 15 | $TiO_2$ | 2.30 | 1.17 | 700 |
| 16 | $SiO_2$ | 1.46 | 1.17 | 700 |
| 17 | $TiO_2$ | 2.30 | 1.17 | 700 |
| 18 | $SiO_2$ | 1.46 | 1.13 | 700 |
| 19 | $TiO_2$ | 2.30 | 1.20 | 700 |
| 20 | $SiO_2$ | 1.46 | 1.20 | 700 |
| 21 | $TiO_2$ | 2.30 | 1.20 | 700 |
| 22 | $SiO_2$ | 1.46 | 1.30 | 700 |
| 23 | $TiO_2$ | 2.30 | 1.40 | 700 |
| 24 | $SiO_2$ | 1.46 | 1.40 | 700 |
| 25 | $TiO_2$ | 2.30 | 1.40 | 700 |
| 26 | $SiO_2$ | 1.46 | 1.40 | 700 |
| 27 | $TiO_2$ | 2.30 | 1.40 | 700 |
| 28 | $SiO_2$ | 1.46 | 1.40 | 700 |
| 29 | $TiO_2$ | 2.30 | 1.40 | 700 |
| 30 | $SiO_2$ | 1.46 | 1.40 | 700 |
| 31 | $TiO_2$ | 2.30 | 1.40 | 700 |
| 32 | $SiO_2$ | 1.46 | 1.40 | 700 |
| 33 | $TiO_2$ | 2.30 | 1.40 | 700 |
| 34 | $SiO_2$ | 1.46 | 1.40 | 700 |
| 35 | $TiO_2$ | 2.30 | 1.40 | 700 |
| 36 | $SiO_2$ | 1.46 | 1.40 | 700 |
| 37 | $TiO_2$ | 2.30 | 1.40 | 700 |
| 38 | $SiO_2$ | 1.46 | 1.40 | 700 |
| 39 | $TiO_2$ | 2.30 | 1.40 | 700 |
| 40 | $SiO_2$ | 1.46 | 0.70 | 700 |

Table 2 shows the composition of the multilayer film 3 of the IR-cut filter 1 and the optical film thickness of each thin film 31, 32.

Further, in Example 2, as shown in Table 2, layers 1, 2, 10, 11, 18 to 22, and 40 of the 40 layers of the multilayer film 3 are the adjustment layers 3d.

As shown in FIG. 7, it is found that the transmittance of the IR-cut filter 1 is of Example 2 decreases gradually for light having a wavelength from about 650 nm to about 700 nm. In other words, the transmittance decreases gradually in a band from a visible region to an infrared region, i.e., the sharp decrease in transmittance is prevented.

As described above, the IR-cut filter 1 has an operational effect similar to that of the IR-cut filter 1 of Embodiment 1.

The IR-cut filter 1 of Embodiment 2 has the following operational effect different from that of Embodiment 1. The first layer 3a, the second layer 3b and the third layer 3c have thicknesses which are sequentially increased. The first thin film 31 and the second thin film 32 have substantially the same optical film thickness in the first layer 3a and the third layer 3c, while the other layer is the second layer 3b. Therefore, it is possible to prevent a sharp change in transmittance in a high transmittance region, for example, around 30% transmittance as shown in FIG. 6.

Further, the optical film thicknesses of the first thin film 31 and the second thin film 32 in the first layer 3a and the third layer 3c are designed to be changed by a small amount. Therefore, small change amounts in transmittance (e.g., values no greater than a significant digit, which are not shown in the optical film thickness Nd of Table 2) can be suppressed in a predetermined wavelength band other than the change wavelength band in which the transmission changes sharply.

Further, the adjustment layer 3d is provided. The adjustment layer 3d suppresses a change amount of transmittance that changes sharply between the first layer 3a, the second layer 3b and the third layer 3c. Thus, the adjustment layer 3d is more preferable for the formation of an inflection point X.

Figure 8:
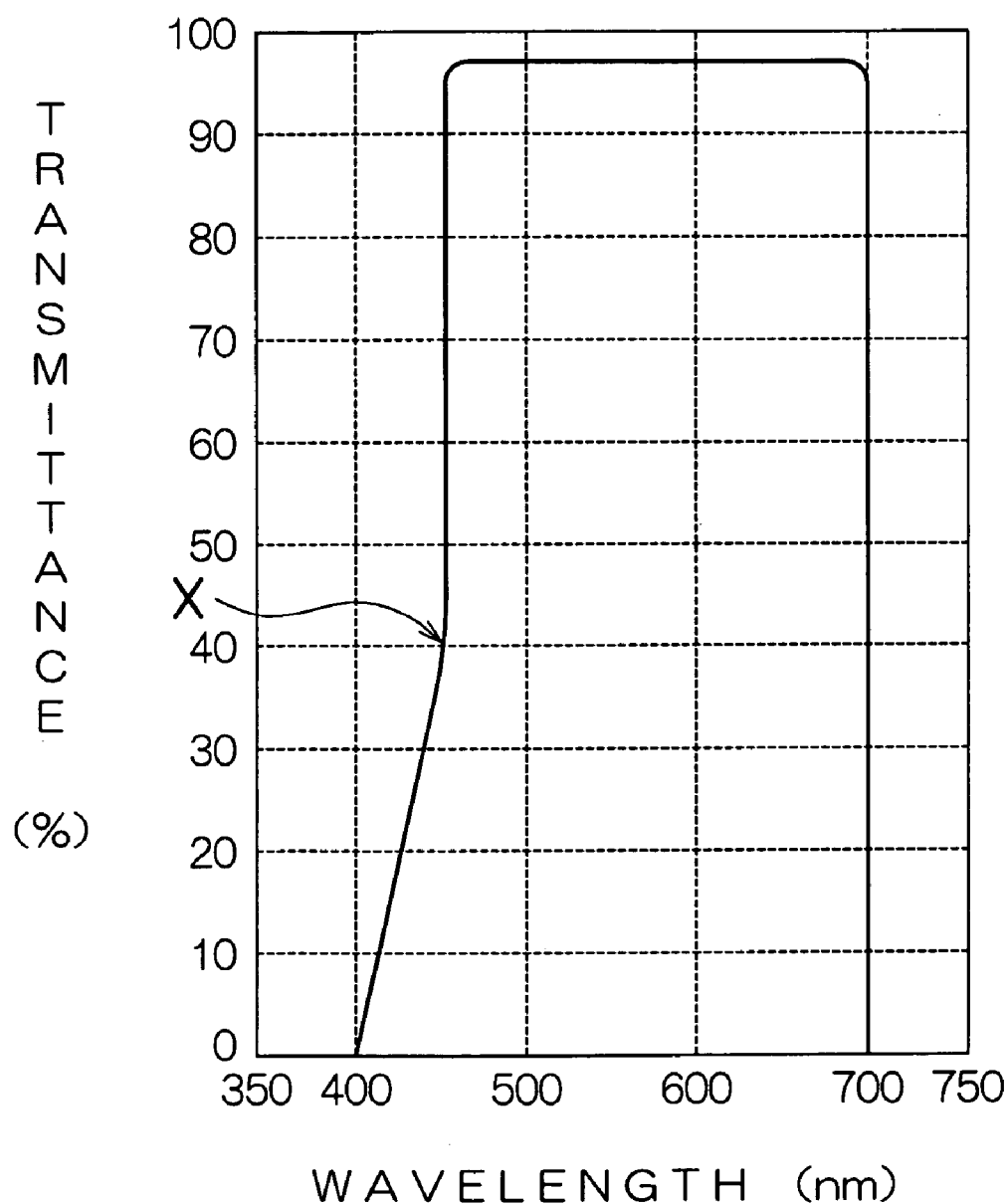
FIG. 8 is a schematic diagram showing transmittance characteristics of an ultraviolet cut filter according to Embodiment 2 of the present invention.

Although the multilayer film 3 is formed to cut light in a band from a visible region to an infrared region in Embodiment 2, the present invention is not limited thereto. A multilayer film may be formed to cut light in a band from an ultraviolet region to a visible region. In this case, the visible region has wavelength as shown in FIG. 8, i.e., transmittance characteristics approximate to those perceived by the human eye can be obtained in the band from the ultraviolet region to the visible region.

Figure 9:
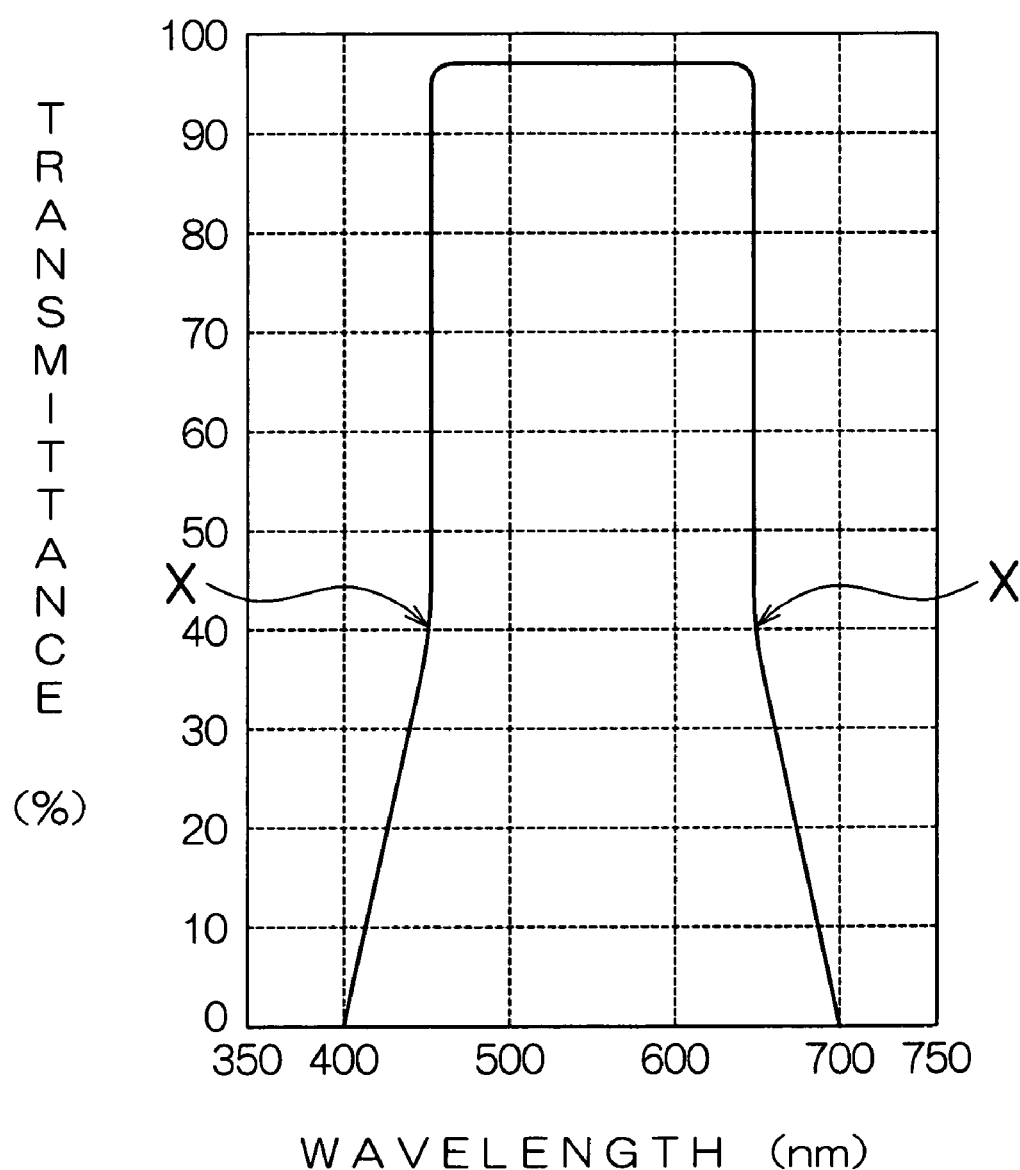
FIG. 9 is a schematic diagram showing an ultraviolet cut filter according to Embodiment 2 of the present invention.

Although the multilayer film 3 is formed on one side of the crystal plate 2 in order to cut light in a band from a visible region to an infrared region in Embodiment 2, the present invention is not limited thereto. For example, another multilayer film 3 may be formed on the other side of the crystal plate 2 in order to cult light in a band from an ultraviolet region to a visible region as well as the formation of the multilayer film 3 on the one side of the crystal plate 2 in order to cut light in the band from the visible region to the infrared region. In this case, the visible region has wavelength as shown in FIG. 9, so that transmittance characteristics approximate to those perceived by the human eye are obtained. Alternatively, a multilayer film 3 may be formed on one side of the crystal plate 2 in order to cut light in a band from an ultraviolet region to a visible region, while a multilayer film 3 may be formed on the other side of the crystal plate 2 in order to cut light in a band from a visible region to an infrared region. In this case, the same transmittance characteristics are obtained.

Figure 10:
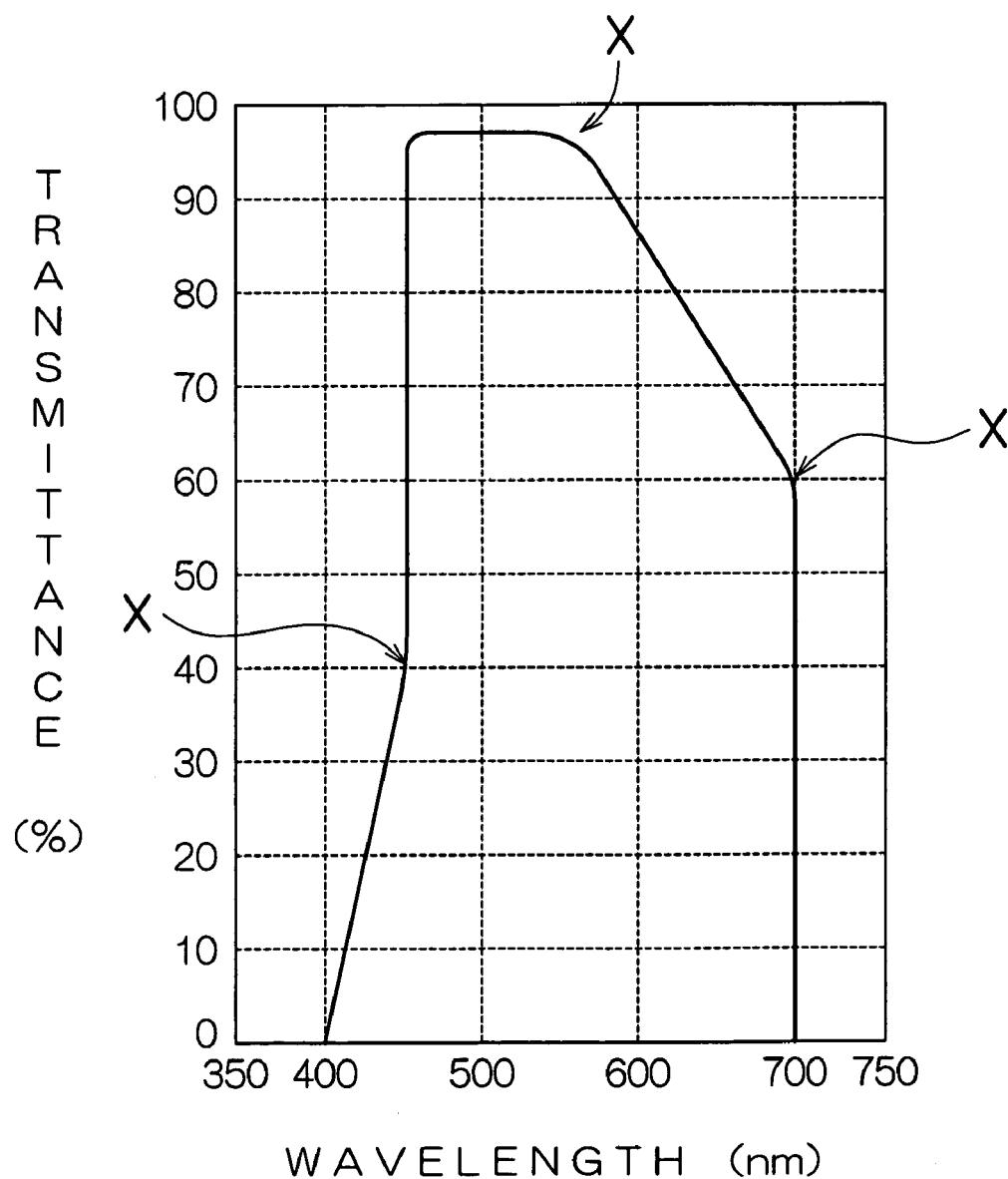
FIG. 10 is a schematic diagram showing transmittance characteristics of an ultraviolet and IR-cut filter according to Embodiments 1 and 2 of the present invention.
Figure 11:
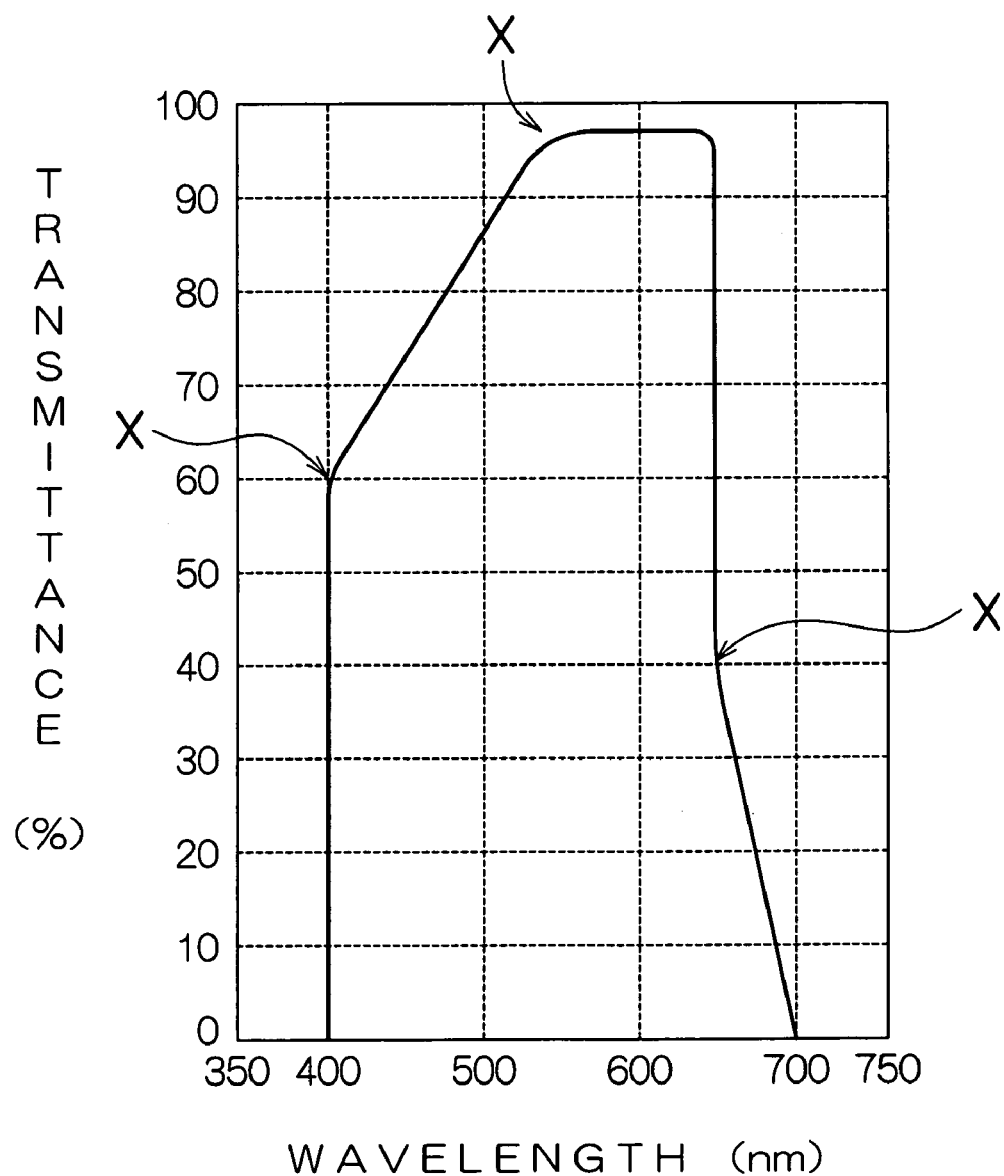
FIG. 11 is a schematic diagram showing transmittance characteristics of an ultraviolet and IR-cut filter according to Embodiments 1 and 2 of the present invention.

Alternatively, the multilayer film 3 of Embodiment 1 may be formed on one side of the crystal plate 2 in order to cut light in a band from a visible region to an infrared region, while the multilayer film 3 of Embodiment 2 may be formed on the other side of the crystal plate 2 in order to cult light in a band from an ultraviolet region to a visible region. In this case, the visible region has wavelength as shown in FIG. 10, so that transmittance characteristics approximate to those perceived by the human eye are obtained when the filter is used in combination with an imaging apparatus. Alternatively, the multilayer film 3 of Embodiment 1 may be formed on one side of the crystal plate 2 in order to cut light in a band from a ultraviolet region to an infrared region, while the multilayer film 3 of Embodiment 2 may be formed on the other side of the crystal plate 2 in order to cult light in a band from a visible region to an infrared region. In this case, the visible region has wavelength as shown in FIG. 11, so that transmittance characteristics approximate to those perceived by the human eye are obtained when the filter is used in combination with an imaging apparatus. Although, in this example, the multilayer film 3 of Embodiment 1 is provided on one side of the crystal plate 2 while the multilayer film 3 of Embodiment 2 is provided on the other side of the crystal plate 2, the present invention is not limited thereto. Alternatively, the multilayer film 3 of Embodiment 2 is provided on one side of the crystal plate 2, while the multilayer film 3 of Embodiment 1 is provided on the other side of the crystal plate 2.

Although, in the sharpness prevention means of Embodiment 2, the adjustment layer 3d is provided between the first layer 3a, the second layer 3b and the third layer 3c, and the adjustment layer 3d is further provided on both ends of the layered structure, the present invention is not limited thereto. For example, the adjustment layer 3d may be provided at any location of the locations between the first layer 3a and the second layer 3b, between the second layer 3b and the third layer 3c, and on both ends of the layered structure in order to suppress a change amount of transmittance that changes sharply any of the locations between the first layer 3a and the second layer 3b and between the second layer 3b and the third layer 3c.

Although the inflection point X is set to 40% transmittance in Embodiment 2 as shown in FIG. 6, these values are only for illustrative purposes and the present invention is not limited to these values.

Figure 12:
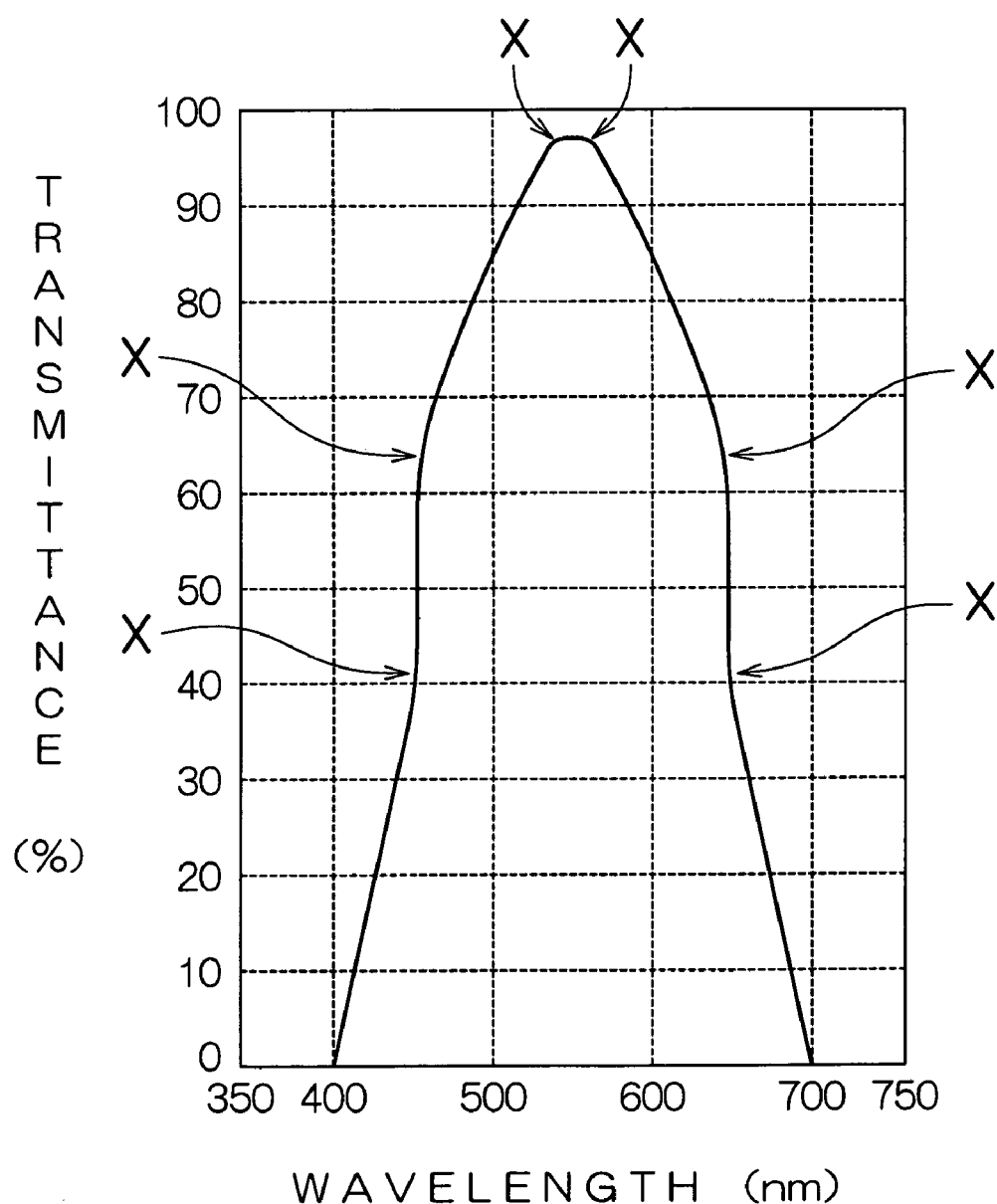
FIG. 12 is a schematic diagram showing transmittance characteristics of an ultraviolet and IR-cut filter according to Embodiments 1 and 2 of the present invention.
Figure 13:
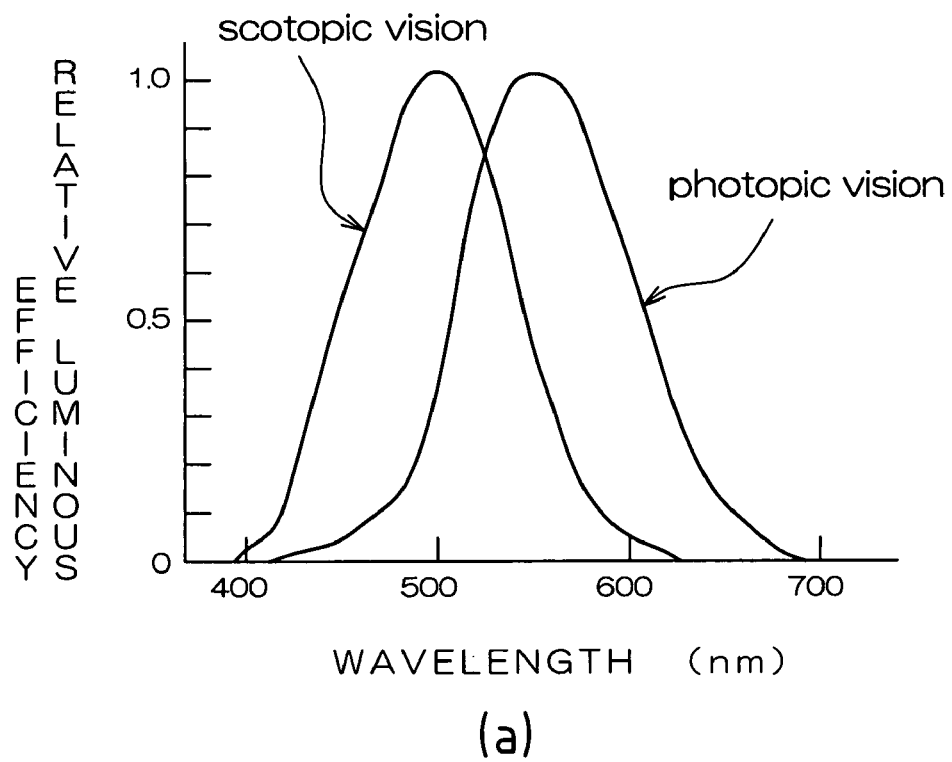
FIG. 13($a$) is a diagram showing the sensitivity characteristics of the human eye.
Figure 13:
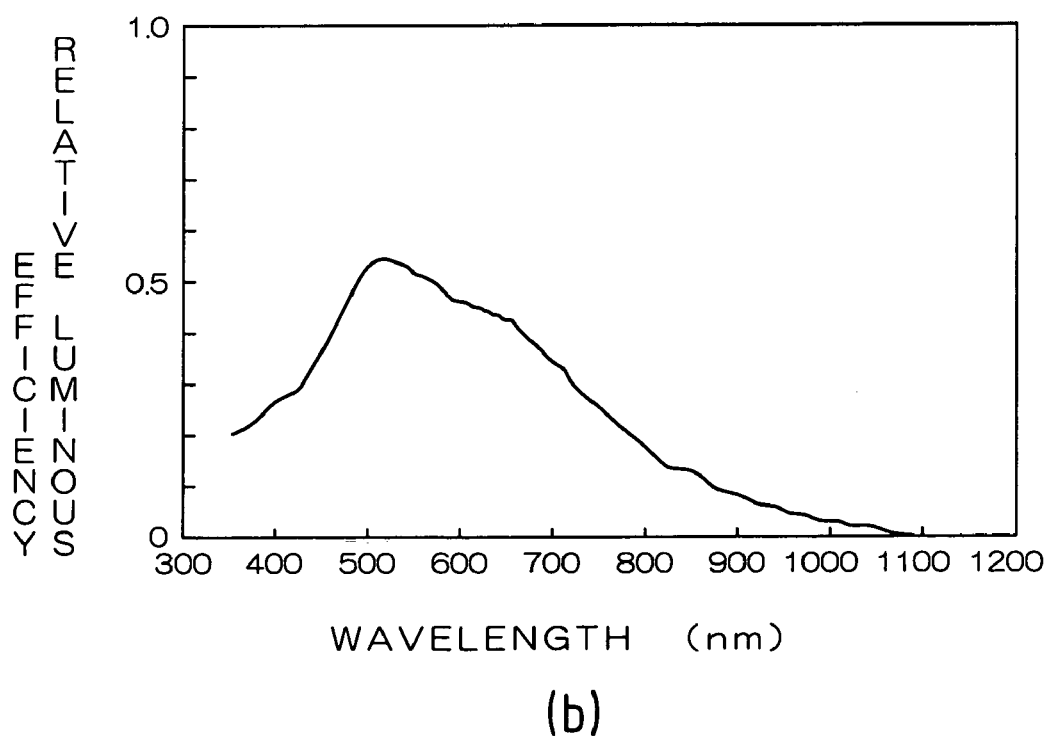
Figure 14:
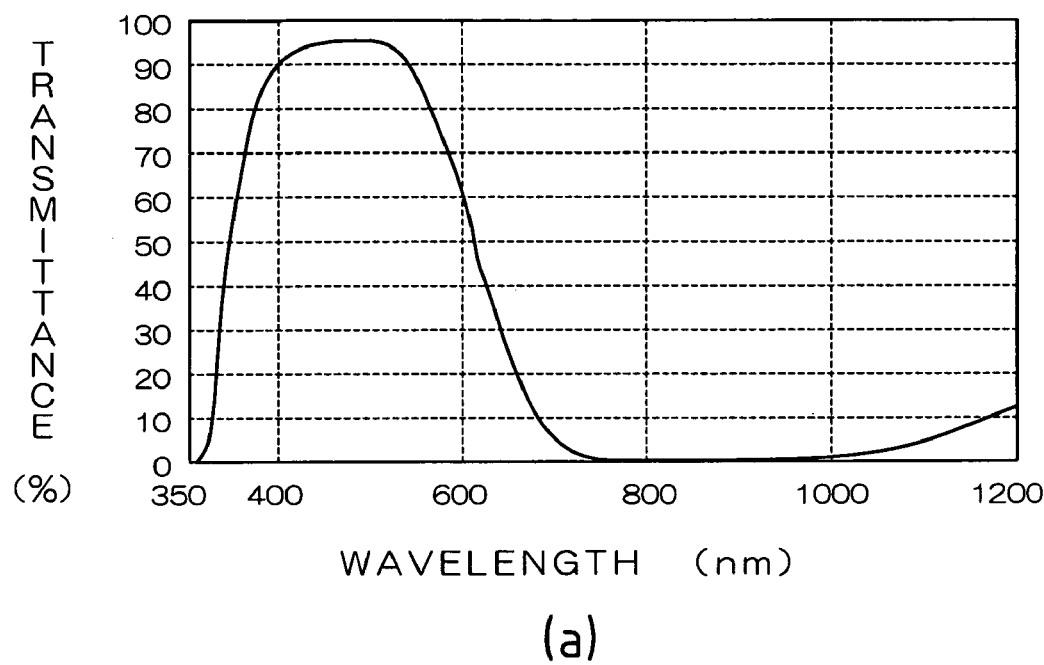
FIG. 14($a$) is a diagram showing transmittance characteristics of infrared absorbing glass.
Figure 14:
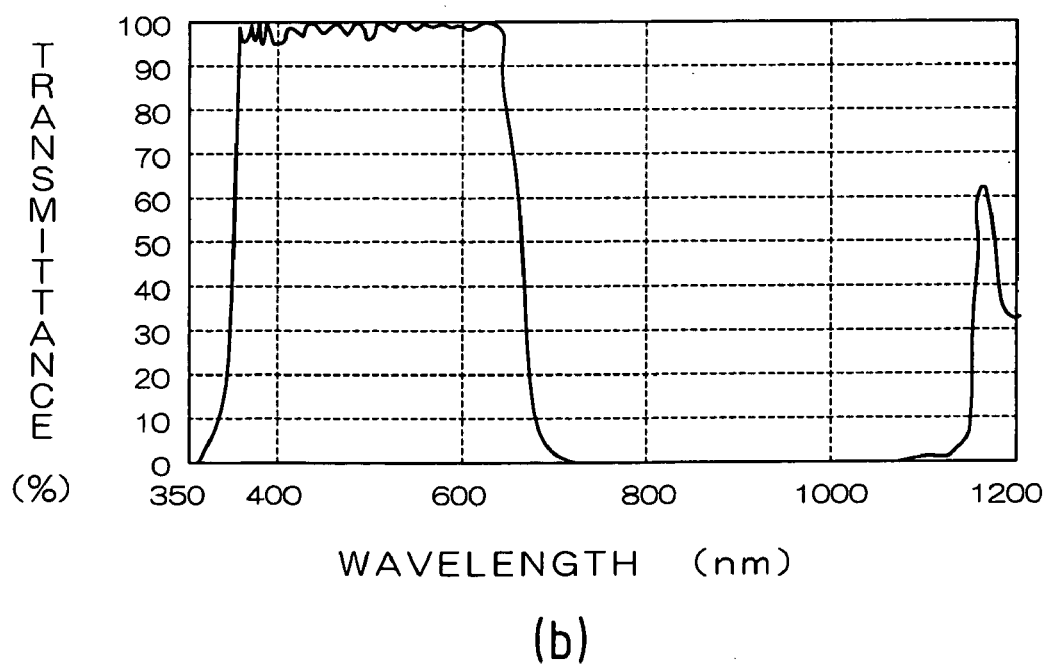

Although the multilayer film 3 is composed of three layers, i.e., the first layer 3a, the second layer 3b and the third layer 3c in Embodiment 2, the present invention is not limited thereto. Alternatively, the multilayer film 3 may be composed of the first layer 3a and the second layer 3b. In this case, a band from an ultraviolet region to a visible region is preferably adjusted. For example, the multilayer film 3 may be composed of three or more layers. In this case, a larger number of inflection points X can be preferably formed. For example, the multilayer films 3 of Embodiments 1 and 2 may be formed on one side of the crystal plate 2 in order to cut light in a band from a visible region to an infrared region, while the multilayer films 3 of Embodiments 1 and 2 may be formed on the other side of the crystal plate 2 in order to cult light in a band from an ultraviolet region to a visible region. In this case, the visible region has wavelength as shown in FIG. 12, so that transmittance characteristics approximate to those perceived by the human eye are obtained when the filter is used in combination with an imaging apparatus. Although, in this example, the multilayer film 3 of Embodiment 1 is provided on one side of the crystal plate 2 while the multilayer film 3 of Embodiment 2 is provided on the other side of the crystal plate 2, the present invention is not limited thereto. Alternatively, the multilayer film 3 of Embodiment 2 is provided on one side of the crystal plate 2, while the multilayer film 3 of Embodiment 1 is provided on the other side of the crystal plate 2.

Although the multilayer film 3 is composed of 40 layers in Example 2, the number of layers is not limited.

As described above, the ray cut filter of the present invention prevents a sharp change in transmittance within a predetermined wavelength band (e.g., a visible region), thereby making it possible to obtain transmittance characteristics approximate to those perceived by the human eye.

Specifically, the ray cut filter of the present invention comprises a multilayer film having a sharpness prevention means for providing an inflection point at a wavelength in a change wavelength band, in which transmittance changes sharply, to prevent a sharp change in transmittance in a predetermined wavelength band. Therefore, a sharp change in transmittance within a predetermined wavelength band (e.g., a visible region) is prevented, thereby making it possible to obtain transmittance characteristics approximate to those perceived by the human eye.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Patent Application No. 2003-152751 filed in Japan on May 29, 2003, the entire contents of which are hereby incorporated by reference.

The present invention is applicable to an IR-cut filter as well as any ray cut filter.

The invention claimed is:

1. A ray cut filter, comprising:
a transparent plate; and
a multilayer film formed on said transparent plate, wherein:
said multilayer film is composed of first thin films made of a high refractive index material and second thin films made of a low refractive index material,
said first thin films and said second thin films are alternately layered,
said multilayer film is structured so as to form a sharpness preventing means for providing an inflection point at a wavelength, within a change wavelength band in which transmittance changes sharply, which prevents a sharp change in transmittance in a predetermined wavelength band, and
said multilayer film is a layered structure composed of a plurality of layers, each of which is composed of said first and second thin films such that optical film thicknesses of said first thin films and said second thin films differ from layer to layer of said plurality of layers such that said layers have thicknesses different from that of each other,
wherein said sharpness preventing means comprises optical film thicknesses of each thin film of said first and second thin films having substantially the same optical film thickness in at least one of said plurality of layers, and wherein said first and second thin films have optical film thicknesses which gradually increase between others of said layers with distance from said transparent plate,
wherein said sharpness preventing means further comprises adjustment layers provided at at least two locations between said plurality of layers and on both ends of said layered structure, said adjustment layers preventing an amount of change in transmittance from changing sharply between said plurality of layers.

2. The ray cut filter of claim 1, wherein the optical film thicknesses of said first and second thin films differ by a small amount in said at least one of said plurality of layers having substantially the same optical film thickness.

3. The ray cut filter of claim 1, wherein said plurality of layers include a first layer, a second layer and a third layer which increase in thickness sequentially with distance from said transparent plate, and wherein said first and second thin films have substantially the same optical film thickness in said second and third layers.

4. The ray cut filter of claim 3, wherein the optical film thicknesses of said first and second thin films differ by a small amount in said at least one of said plurality of layers having substantially the same optical film thickness.

5. The ray cut filter of claim 1, wherein said plurality of layers include a first layer, a second layer and a third layer which increase in thickness sequentially with distance from said transparent plate, and wherein said first and second thin films have substantially the same optical film thickness in said first and third layers.

6. The ray cut filter of claim 5, wherein the optical film thicknesses of said first and second thin films differ by a small amount in said at least one of said plurality of layers having substantially the same optical film thickness.

7. The ray cut filter of claim 1, wherein said multilayer film corresponds to a wavelength band from the visible region to the infrared region and is formed on one side of said transparent plate, and a second said multilayer film corresponding to a wavelength band from the ultraviolet region to the visible region is formed on the other side of said transparent plate.

8. The ray cut filter of claim 7, wherein the optical film thicknesses of said first and second thin films differ by a small amount in said at least one of said plurality of layers having substantially the same optical film thickness.

* * * * *